US010125899B2

(12) United States Patent
Andersen

(10) Patent No.: US 10,125,899 B2
(45) Date of Patent: Nov. 13, 2018

(54) MODIFICATION DEVICE AND VENT HOOD HAVING SUCH A DEVICE

(75) Inventor: John L. Andersen, Flint, TX (US)

(73) Assignee: Builder's Best, Inc., Jacksonville, TX (US)

( * ) Notice: Subject to any disclaimer, the term of this patent is extended or adjusted under 35 U.S.C. 154(b) by 1250 days.

(21) Appl. No.: 11/746,279

(22) Filed: May 9, 2007

(65) Prior Publication Data
US 2008/0277918 A1    Nov. 13, 2008

(51) Int. Cl.
F24C 15/20 (2006.01)
F16L 5/00 (2006.01)

(52) U.S. Cl.
CPC ........... F16L 5/00 (2013.01); Y10T 29/49815 (2015.01)

(58) Field of Classification Search
CPC .............. F24F 13/08; F24C 15/20; F16L 5/00
USPC ............... 454/67, 270, 370; 285/4; 138/89.1
See application file for complete search history.

(56) References Cited

U.S. PATENT DOCUMENTS

| | | | | |
|---|---|---|---|---|
| 2,751,102 A * | 6/1956 | Kihm | ........................... | 215/256 |
| 3,281,007 A * | 10/1966 | Dorosz | ........................ | 220/270 |
| 3,734,333 A * | 5/1973 | Foss | ............................... | 215/255 |
| 4,032,029 A * | 6/1977 | Cochrane | ...................... | 215/256 |
| 4,133,300 A * | 1/1979 | Burton et al. | ............. | 126/299 D |
| 4,555,038 A * | 11/1985 | Nagel, Jr. | ...................... | 215/235 |
| 4,633,766 A * | 1/1987 | Nation et al. | ................. | 454/370 |
| 4,750,411 A * | 6/1988 | Eversole | ...................... | 454/292 |
| 4,823,971 A * | 4/1989 | Her | ............................... | 220/4.01 |
| 5,036,636 A * | 8/1991 | Hasty | ............................... | 52/100 |
| 5,176,408 A * | 1/1993 | Pedersen | ........................ | 285/42 |
| 5,711,536 A * | 1/1998 | Meyers | ......................... | 277/606 |
| 5,816,906 A * | 10/1998 | Mai | ............................... | 454/56 |
| 5,882,014 A * | 3/1999 | Gavin | .......................... | 277/602 |
| 6,360,909 B1 * | 3/2002 | Bridge | ........................ | 220/258.2 |
| 6,575,475 B1 * | 6/2003 | Duncan | ........................ | 277/607 |
| 6,626,972 B2 * | 9/2003 | Chiang et al. | ................. | 55/418 |
| 6,817,631 B1 * | 11/2004 | Gavin | ........................ | 285/139.1 |
| 2005/0073113 A1 * | 4/2005 | Brochu et al. | ................. | 277/606 |

* cited by examiner

Primary Examiner — Steven B McAllister
Assistant Examiner — Samantha Probst
(74) Attorney, Agent, or Firm — Price Heneveld LLP

(57) ABSTRACT

A modification apparatus for an object is provided. Generally, the modification device is in an object of substantially uniform thickness, has two grooves defining a strip therebetween, and a fingerpiece attached to the strip. The fingerpiece, strip, and material of the grooves can be removed from the object by moving the fingerpiece until the modification apparatus is torn away from the object. A vent hood comprising this modification apparatus is provided as well. A method of using the modification apparatus is also provided.

15 Claims, 2 Drawing Sheets

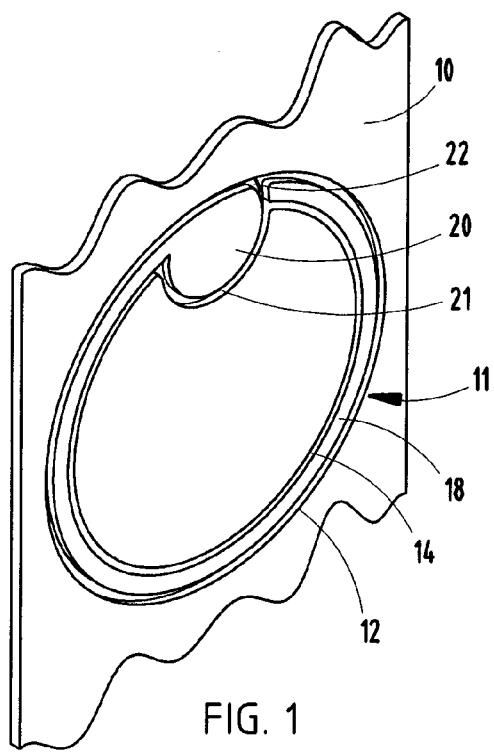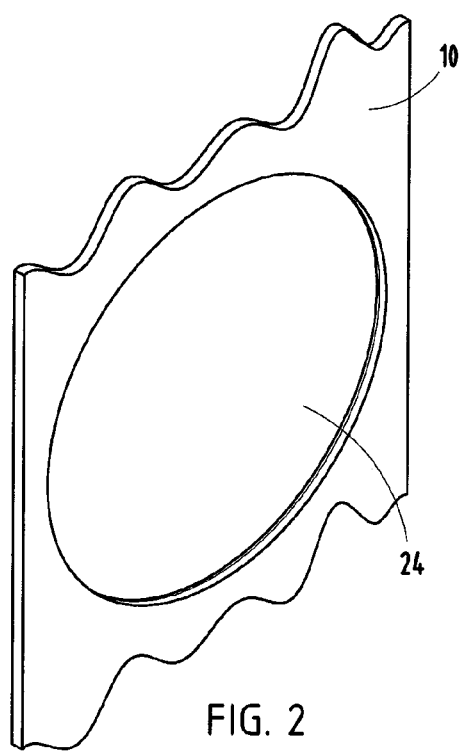
FIG. 1    FIG. 2
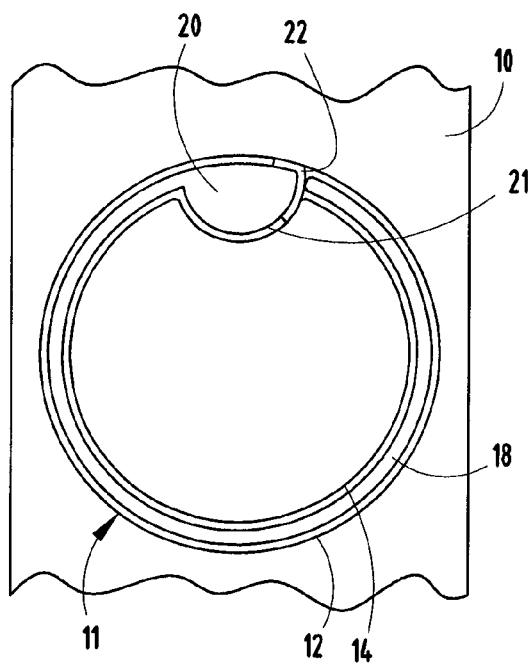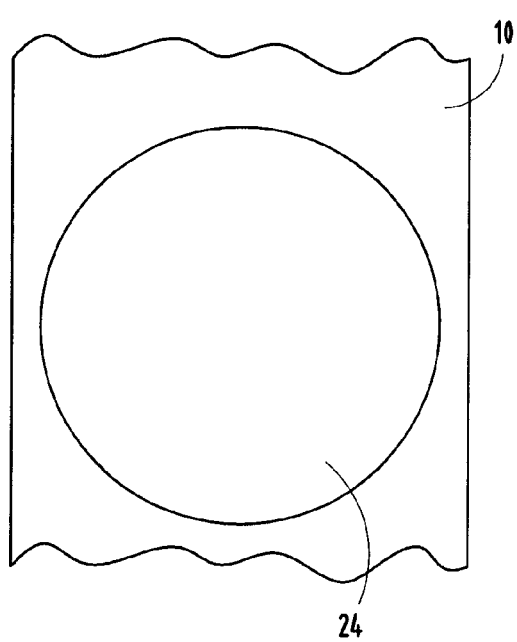
FIG. 3    FIG. 4

MODIFICATION DEVICE AND VENT HOOD HAVING SUCH A DEVICE

This invention relates to an apparatus for removing material from an object to modify the object, and, in particular, to remove a plastic piece from an object to modify it or enlarge an aperture in it. The invention also relates to a method of using the unique apparatus.

BACKGROUND OF THE INVENTION

Products, particularly those made of plastic, often need or are desired to be modified to perform a particular function. For example, ventilation ducting can have many different sizes, such as a 3-inch diameter or a 4-inch diameter. Plastic molded fittings for such ventilation ducts are molded with an aperture that only fits one size of ventilation ducts. In the manufacturing process, to change the diameter of the hole in a particular molded piece, a die must be changed or at least the insert must be changed to manufacture pieces with different-sized apertures in them.

It is possible to use a tool which can make four pieces at a time, which is commonly referred to as a four-up die of various sizes. However, unless selling exact multiples of 25% of the various sizes, the manufacturer will have to manufacture excess of a part. For example, if one sells 80% of a certain size and 20% of a second size, necessarily extra pieces of the second size will need to be made, creating unnecessary inventory and/or waste. Moreover, having multiple parts varying only by having different size apertures or other slight modifications among them requires at least two sets of SKUs, at least two sets of inventory, and, if other modifications are needed, this multiplies exponentially.

"Knock-outs" have been used to create a section of an object where a hole may be desired, but the knock-outs can be difficult to remove depending on the size and material. Also, if too much force is used in the removal of the knock-out, the object may be cracked or broken.

Thus, there is a desire for an object having structure which allows it to be modified either by the manufacturer or by the customer to solve the balance issues with creating multiple products, and to reduce inventory levels and SKU requirements.

SUMMARY OF THE INVENTION

One aspect of the present invention is an apparatus for removing material from an object. The device comprises an object, at least a portion of which has a substantially uniform surface, a first groove and a second groove, which are positioned adjacent to each other to create a strip between them. A fingerpiece is connected to the strip. The fingerpiece is adapted to facilitate the removal of both the fingerpiece and strip to modify the object.

Another aspect of the invention is a method of removing material from an object. The method comprises the steps of providing an object, at least a portion of which has a substantially uniform surface, a first groove, and a second groove. The first and second indents are positioned adjacent each other to create a strip between them and the object also has a fingerpiece attached to the strip. The fingerpiece is moved to partially remove it from the object and to start the removal of the strip. The fingerpiece is then pulled to remove the strip from the object to modify the object.

Yet another aspect of the present invention is a vent hood having a perimeter wall and a portion having a substantially uniform surface. The object also has a first groove and a second groove in the substantially uniform surfaced portion, the grooves positioned adjacent each other and defining a strip between them. A fingerpiece is at one end of the strip and is adapted to facilitate the removal of the fingerpiece and strip to modify the vent hood.

These and other features, advantages and objects of the present invention will be further understood and appreciated by those skilled in the art by reference to the following specification, claims and appended drawings.

BRIEF DESCRIPTION OF THE DRAWINGS

FIG. 1 is a perspective view of a cutaway portion of an object embodying the present invention;

FIG. 2 is a perspective view of the object of FIG. 1 after the present invention has been used;

FIG. 3 is an elevational view of the cutaway portion of an object of FIG. 1 embodying the present invention;

FIG. 4 is an elevational view of the object of FIG. 1 after the present invention has been used;

DETAILED DESCRIPTION OF PREFERRED EMBODIMENT

Figure 5:
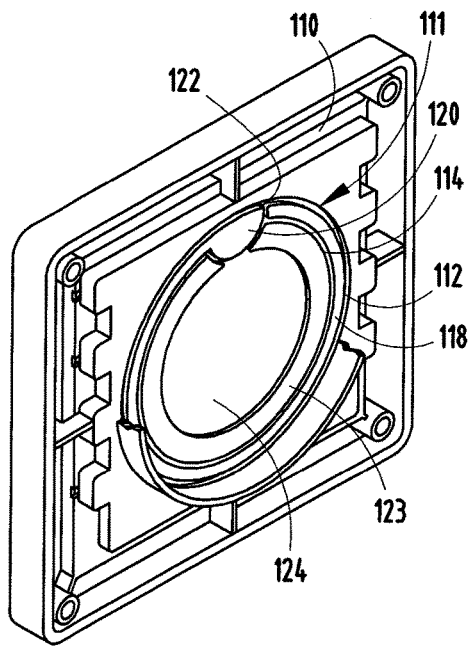
FIG. 5 is a perspective view of a ventilation fitting comprising the present invention.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations, except where expressly specified to the contrary. It is also to be understood that the specific devices and processes illustrated in the attached drawings and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The present invention relates to a device and method for removing material from an object to modify the object as desired. Preferably, the object is flexible or semi-flexible and is relatively thin. However, it is contemplated that the present invention could be used with a rigid and/or thick material.

Referring now to the drawings, FIGS. 1-4 show a cutaway portion of an object 10. Object 10 can be any object for which the manufacturer or user has a desire to modify at some point in time. Object 10 includes a modification device 11 to remove a portion of material from the object 10. Modification device 11 includes two grooves 12 and 14. Grooves 12 and 14 are indented portions that are contiguous material that is thinner than the general thickness of the object 10. Grooves 12 and 14 are positioned close to one another and in this case are concentric circles. They may be other shapes, depending on the desired modification. Grooves 12 and 14 are preferably spaced at the same distance apart from each other along their entire length and, therefore, create a strip 18 between them of uniform width and height.

Modification device 11 also includes a fingerpiece 20, which is positioned at, and is attached to, strip 18. Fingerpiece 20 is preferably attached to the end of strip 18 and shaped in the approximate shape of a finger or thumb. It is used for the beginning of the removal of the strip and inner material of the modifying device 11. In other words, fingerpiece 20 can be moved in a direction to cause initial tearing of the strip from the object 10. Fingerpiece 20 is defined by a portion of groove 12, a bottom groove 21 at its bottom, and an aperture 22, which is located along a portion of the fingerpiece 20. Aperture 22 allows fingerpiece 20 to bend and tear more easily than if it were not present, especially in the initial movement of the fingerpiece 20 to cause the strip to begin to tear away from the object 10. It is contemplated that fingerpiece 20 may have different designs, such as perpendicular to the general plane of the object 10. It is also contemplated that fingerpiece 20 may be in a position other than the end of the strip 18, such as in the middle of it. More than one fingerpiece may also be used.

In operation, fingerpiece 20 is moved, preferably pushed or pulled, so that it begins to move away from the plane of the object 10 due to aperture 22. Enough force should be exerted so that fingerpiece 20 rips away from the object at groove 21 and the portion of groove 12 adjacent the fingerpiece. After fingerpiece 20 is sufficiently torn away from object 10, it can then be grabbed between one's fingers and pulled, causing strip 18 and the material of grooves 12, 14 to tear away from the object. Once torn away completely, it leaves a clean aperture 24 in the object (see FIGS. 2 and 4).

Although modification device 11 can be used in virtually any object, a particular product in which it is particularly useful is a plastic vent fitting, such as a vent hood. Vent hoods can be manufactured of plastic material, such as polypropylene, which is particularly useful for the present invention. FIG. 5 shows the backside of a vent hood 110, which incorporates a modification device 111 such as that described above. In particular, the modification device 111 of the vent hood 110 shown in FIG. 5 includes grooves 112 and 114, which are in a generally circular nature and create a circular strip 118 between them. Modification device 111 also includes fingerpiece 120, which is partially defined by an aperture 122. Adjacent to groove 114 is an inner lip 123 which defines a hole 124 that is approximately 3 inches in diameter and is adapted to receive a 3-inch ventilation duct if so desired. However, if a 4-inch duct is being used and a 4-inch hole is therefore desired, modification device 111 can be used in the above-described manner to remove the material of the modification device 111 and lip 123 to provide a 4-inch hole instead of a 3-inch hole, similar to that shown in FIG. 4 or FIG. 7.

Figure 6:
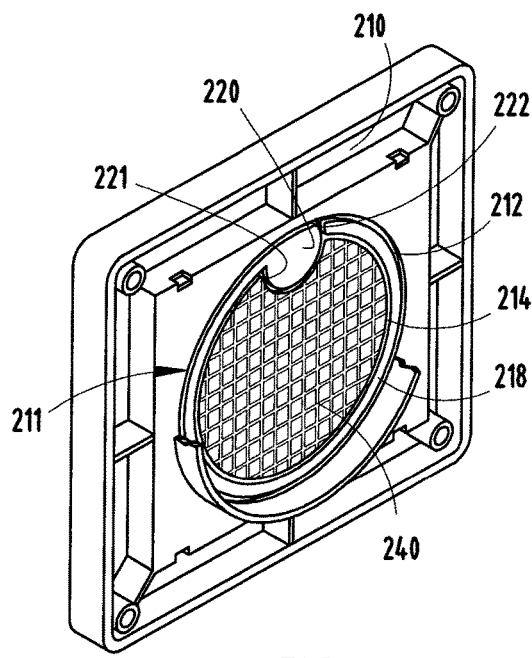
FIG. 6 is a perspective view of a ventilation fitting with a grate and comprising the present invention.
Figure 7:
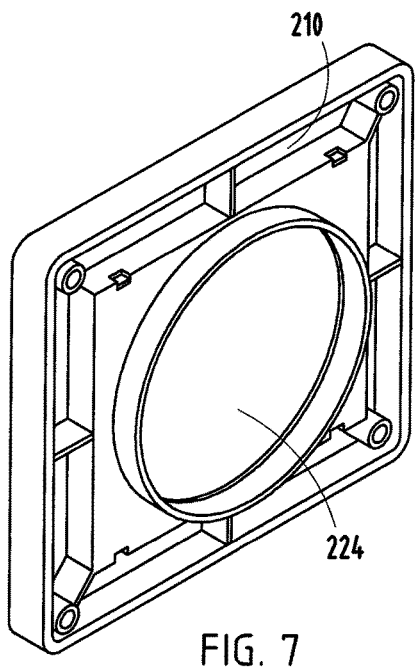
FIG. 7 is a perspective view of the ventilation fitting of FIG. 6 after the present invention has been used.

Another embodiment is shown in FIGS. 6 and 7. FIGS. 6 and 7 show a vent hood 210 that has a plastic screen mesh 240 radially inward of a modification device 211. The screen is molded as a part of the structure of vent hood 210. Modification device 211 includes a first groove 212, a second groove 214, and a strip 218 between the grooves. It also includes a fingerpiece 220, a bottom groove 221, and a finger aperture 222 to assist in the commencement of the removal of the strip if so desired. If an end user of the vent hood wishes to keep the mesh screen 240 in place to stop insects and other material from either exiting or entering the vent, the user would install vent hood 210 as is. However, if the user does not wish to have the mesh screen 240 as part of the vent hood, he or she simply would use the modification device 211 as described above to remove the modification device and the mesh screen 240, which is connected to it. After using modification device 211, a hole 224 would remain, resulting in a vent hood without a screen as shown in FIG. 7.

The above-described invention and the preferred embodiments of that invention create a useful and novel device that solves the problem of having to use multiple molds or dies and multiple SKUs for very similar products. It is also easy to use and results in very little waste of material.

The above description is considered that of the preferred embodiment(s) only. Modifications of the invention will occur to those skilled in the art and to those who make or use the invention. Therefore, it is understood that the embodiment(s) shown in the drawings and described above are merely for illustrative purposes and not intended to limit the scope of the invention, which is defined by the following claims as interpreted according to the principles of patent law, including the doctrine of equivalents.

The invention claimed is:

1. An apparatus for removing material from an object, comprising:
   the object at least a portion of which has a substantially uniform surface;
   a first groove and a second groove, the first and second grooves positioned adjacent each other and defining a strip between them; and
   a fingerpiece connected to the strip; the fingerpiece being formed by the first groove and a bottom groove connected to the second groove, wherein the bottom groove does not connect to the first groove;
   wherein the fingerpiece is adapted to facilitate the removal of the fingerpiece and strip to modify the object;
   the apparatus, including the strip and fingerpiece, wherein each of the strip and the fingerpiece are substantially flat and planar with one another, and the fingerpiece is substantially flat and planar along its entire length; and
   the fingerpiece and strip having a substantially uniform thickness.

2. The device of claim 1, wherein the strip is in the shape of a circle.

3. The device of claim 2, wherein the object is of a flexible material.

4. The device of claim 3, wherein the object is of polypropylene.

5. The device of claim 1, wherein the object is of a flexible material.

6. The device of claim 5, wherein the object is of polypropylene.

7. A vent hood comprising:
   a first wall, a second wall, a third wall, and a fourth wall creating a perimeter wall defining an interior space;
   a portion having a substantially uniform surface at least partially located within the interior space;
   an inner groove and an outer groove in the substantially uniform surfaced portion, the inner and outer grooves positioned adjacent each other and defining a strip between them;
   a first aperture located inward of the strip and having a first area; and
   a fingerpiece at one end of the strip, the fingerpiece being formed by the outer groove and a bottom groove connected to the inner groove, wherein the bottom groove does not connect to the outer groove; wherein each of the fingerpiece and the strip are substantially flat and planar with one another, and the fingerpiece is substantially flat and planar along its entire length, wherein the fingerpiece is adapted to facilitate the removal of the fingerpiece and strip to modify the vent hood by replacing the first aperture with a second aperture having a second area that is greater than the first area, and wherein the outer groove extends about a majority of the second aperture.

8. The vent hood of claim 7, and further comprising a screen radially inward of the inner groove.

9. The vent hood of claim 7, and further comprising a lip radially inward of the inner groove, the lip defining the first aperture.

10. A vent hood comprising:
a plurality of walls cooperating to form a perimeter wall;
a portion having a substantially uniform thickness; and
an inner groove and an outer groove in the substantially uniform thickness portion, the inner and outer grooves positioned adjacent each other and defining a strip between them; and
a fingerpiece at one end of the strip, the fingerpiece being formed by the outer groove and a bottom groove connected to the inner groove, wherein the bottom groove does not connect to the outer groove; wherein each of the fingerpiece and the strip are substantially flat and planar with one another, and the fingerpiece is substantially flat and planar along its entire length;
wherein the fingerpiece is adapted to facilitate the removal of the fingerpiece and strip to modify the vent hood.

11. The vent hood of claim 10, and further comprising a screen radially inward of the inner groove.

12. The vent hood of claim 10, and further comprising:
a lip radially inward of the inner groove, the lip defining an inner aperture.

13. The vent hood of claim 10, wherein the portion is substantially planar.

14. A vent hood comprising:
a first wall, a second wall, a third wall, and a fourth wall creating a perimeter wall;
a portion having a surface;
an inner groove and an outer groove in the surface of the portion, the inner and outer grooves positioned adjacent each other and defining a strip between them; and
a first aperture located inward of the strip and having a first diameter of approximately three inches; and
a fingerpiece at one end of the strip, the fingerpiece being formed by the outer groove and a bottom groove connected to the inner groove, wherein the bottom groove does not connect to the outer groove; wherein the fingerpiece is adapted to facilitate the removal of the fingerpiece and strip to modify the vent hood by replacing the first aperture with a second aperture having a second diameter of approximately 4 inches, and wherein each of the fingerpiece and the strip are substantially flat and planar with one another, and the fingerpiece is substantially flat and planar along its entire length.

15. A vent hood comprising:
a first wall, a second wall, a third wall, and a fourth wall creating a perimeter wall defining an interior space;
a portion having a substantially uniform surface at least partially located within the interior space;
an inner groove and an outer groove in the substantially uniform surfaced portion, the inner and outer grooves positioned adjacent each other and defining a strip between them; and
a first aperture located inward of the strip and having a first area; and
a fingerpiece at one end of the strip, the fingerpiece being formed by the outer groove and a bottom groove connected to the inner groove, wherein the bottom groove does not connect to the outer groove; wherein the fingerpiece is adapted to facilitate the removal of the fingerpiece and strip to modify the vent hood by replacing the first aperture with a second aperture having a second area that is greater than the first area, and wherein each of the fingerpiece and the strip are substantially flat and planar with one another, and the fingerpiece is substantially flat and planar along its entire length.

\* \* \* \* \*